April 17, 1934.   G. THUILLIER   1,954,899
RUBBERED SHOE FOR HORSES OR OTHER HOOFED ANIMALS
Filed Oct. 24, 1932
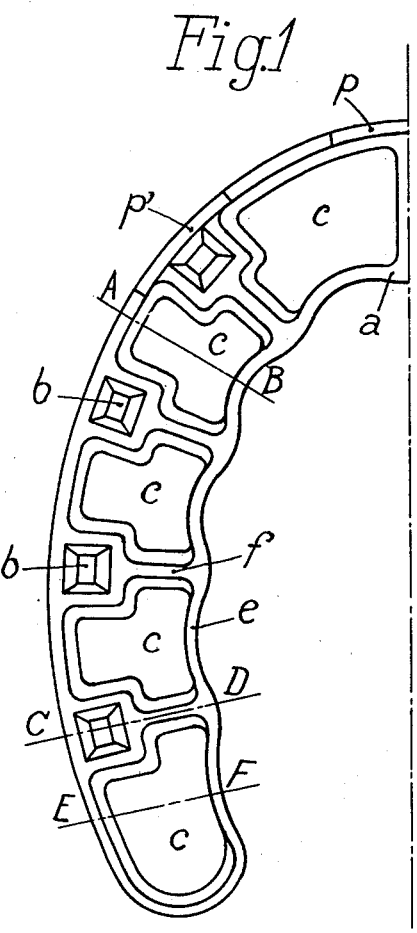
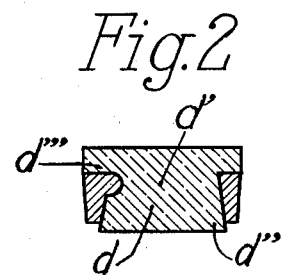
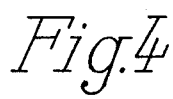
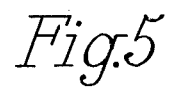
Inventor:
Georges Thuillier
By [signature]
Attorney Patented Apr. 17, 1934

1,954,899

UNITED STATES PATENT OFFICE 1,954,899

RUBBERED SHOE FOR HORSES OR OTHER HOOFED ANIMALS

Georges Thuillier, Domaine de Montrouan par Gibles, France

Application October 24, 1932, Serial No. 639,463
In France August 20, 1932

2 Claims. (Cl. 168—13)

The present invention relates to shoes for horses and other hoofed animals that include a metallic skeleton provided with sockets and resilient pads inserted in said sockets so as to project from the outer and under face of said skeleton.

The object of my invention is to provide a shoe of the type above referred to which can be bent in its own plane so as to be fitted to the hoof that is to be shod.

To this effect, the metallic skeleton consists of an outer rim and an inner rim connected by cross members which separate the sockets from one another, and the inner rim is provided with a plurality of bends preferably thus forming an undulated outline which permits of bending the skeleton so that it conforms to any given shape of shoe.

Fig. 1 is a bottom plan view of one half of the horseshoe;

Fig. 2 is a sectional view on the line A—B of Fig. 1;

Fig. 3 is a sectional view on the line C—D of Fig. 1;

Fig. 4 is a sectional view on the line E—F of Fig. 1;

Fig. 5 is a front elevational view of the metallic armature of the horseshoe.

The metallic skeleton or armature $a$ consists of an outer rim having an outline of the usual shape common to all horse shoes, an inner rim $e$ of sinuous or undulated outline and cross members $f$ integral with both of said rims and extending from one to the other so as to separate sockets $c$. The sockets are filled with india-rubber or any other flexible or elastic material which projects downwardly at $d'$ and $d''$ from the upper and under faces of the armature and covers it entirely at $d'''$ so as to fully and elastically isolate the hoof of the animal from the metallic armature and consequently from the ground.

The rear edges of said armature are, although sufficiently strong for holding and protecting the india-rubber or flexible material, sufficiently thin for preventing skidding on ice or a wet or muddy ground in the same manner as the special nails that are used when the ground is covered with ice. Said edges must also be sufficiently thin for wearing, through contact with the abrasive matters of the ground, more rapidly than the india-rubber which, consequently, is always projecting from the metallic surface and therefore completes and increases the anti-skidding action of the rear edges of the metallic structure of the shoe.

The india-rubber sheet $d$ interposed between metallic armature $a$ and the hoof of the animal has, without any stress, the required elasticity for protecting the foot of the animal against shocks and vibrations.

It will be seen that the skeleton or armature has the form of a trussed element, owing to the presence of partitions $f$ that separate the sockets from one another, but owing to the sinuous outline of inner rim $e$ it has not the rigidity of such an element, and, it can be suitably bent or unbent so as to adapt the horseshoe to the shape of the particular hoof to which it is to be fixed.

The metallic structure can be provided with raised portions $p$, $p'$ along its outer edge, so as to avoid, as in ordinary shoes, that the shoe may skid under tractive efforts.

While I have described what I deem to be a preferred embodiment of my invention, it should be well understood that I do not wish to be limited thereto, as there might be changes made in the arrangement, a disposition and form of the parts, for instance in the shape of the sockets, their number, their arrangement, the thickness of the india-rubber element, the shape of the ribs, the means for obtaining a certain elasticity of the armature, and so on, without departing from the principle of my invention as comprehended within the scope of the appended claims.

What I claim is:

1. A shoe for horses and other hoofed animals, including a metallic skeleton and a plurality of resilient pads inserted in said skeleton, in which the metallic skeleton comprises, an outer rim having an outline of the usual shape, an inner rim having a sinuous outline the general shape of which corresponds to that of the outer rim, a plurality of cross members integral with both of said rims and extending from one to the other so that the resilient pads may be inserted in the spaces between said cross members.

2. A shoe for horses and other hoofed animals, including a metallic skeleton and a plurality of resilient pads inserted in said skeleton, in which the metallic skeleton comprises, an outer rim having an outline of the usual shape, an inner rim having an outline the general shape of which corresponds to that of the outer rim but with a plurality of bends, a plurality of cross members integral with both of said rims and extending from one to the other so that the resilient pads may be inserted in the spaces between said cross members.

GEORGES THUILLIER.